Dec. 25, 1956 J. S. J. HLOBIL 2,775,419
FRACTIONAL ASPECT RATIO AIRCRAFT
Filed Jan. 26, 1952
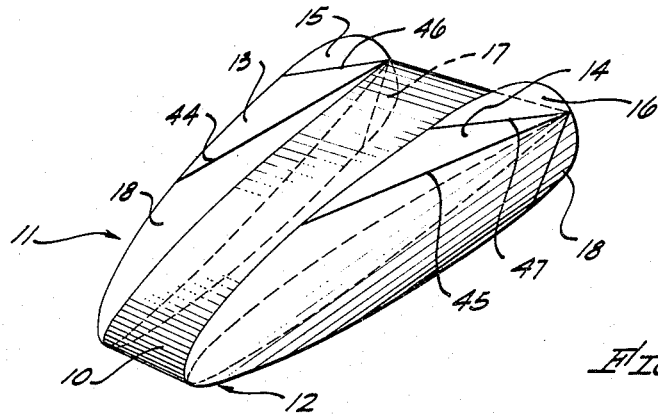
FIG. 1.
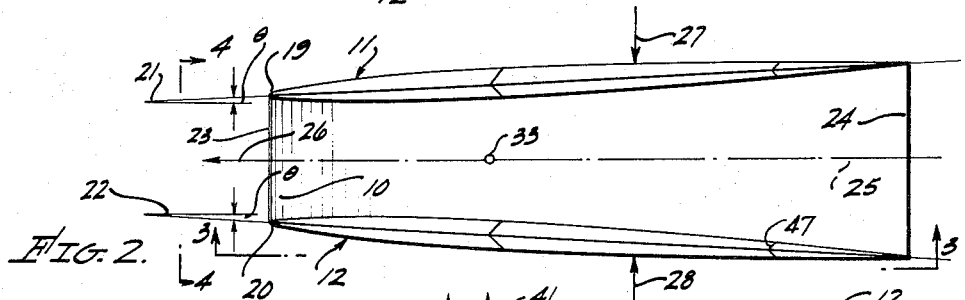
FIG. 2.
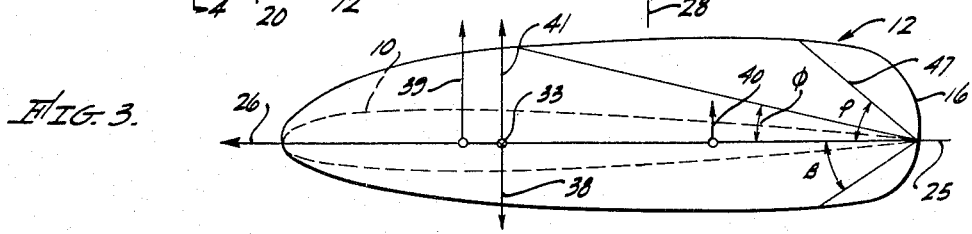
FIG. 3.
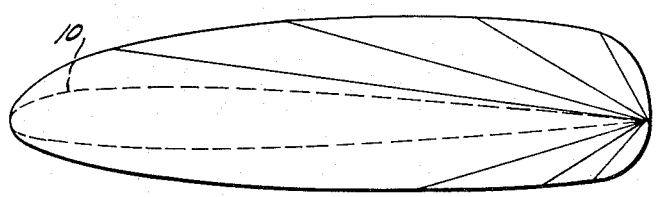
FIG. 5.
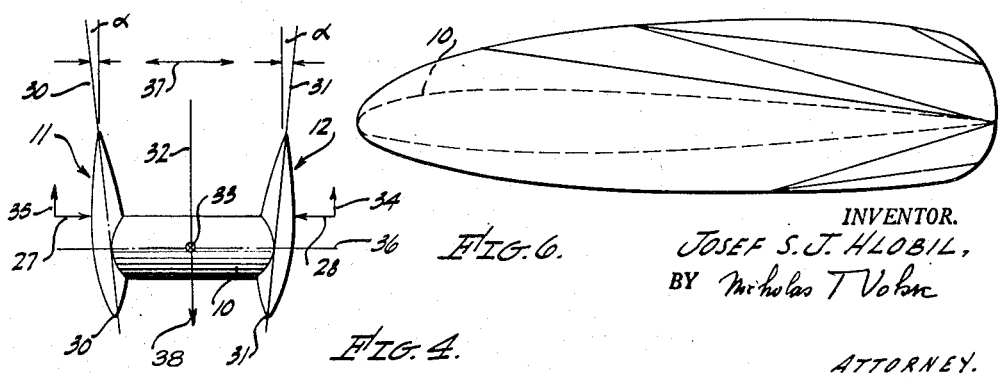
FIG. 6.
FIG. 4.
INVENTOR.
JOSEF S. J. HLOBIL,
BY Nicholas T Volan
ATTORNEY.

United States Patent Office 2,775,419
Patented Dec. 25, 1956

2,775,419

FRACTIONAL ASPECT RATIO AIRCRAFT

Josef S. J. Hlobil, Santa Monica, Calif.

Application January 26, 1952, Serial No. 268,373

9 Claims. (Cl. 244—35)

This invention relates to a heavier than air aircraft, and more particularly to a fractional aspect ratio aircraft in which the length of the wing span is less than the length of the mean wing chord.

This invention provides a fractional aspect ratio aircraft which satisfies all the requirements generally imposed on any heavier-than-air aircraft and, at the same time, it eliminates altogether the parasitic drag of the fuselage present in the conventional aircraft now in use. Therefore, it furnishes the desired useful space within the aircraft and all essential controllability and stability, and it accomplishes the above with a higher overall aerodynamic efficiency by reducing the parasitic drag as compared to the drag of conventional wing-fuselage-empennage configuration. The above is accomplished by introducing a channel flow theory or principle into the realm of aerodynamics of aircraft, and combining this channel flow principle with the lift theory or principle. No practical fractional aspect ratio aircraft can be created without resorting to the channel flow principle which is to the effect that: in order to make the flow lines parallel, in the horizontal plane, to the direction of travel of the fractional aspect ratio airfoil, such airfoil must be provided with lateral restrictions to prevent digression of the flow lines from the all important and necessary parallelism with the direction of travel. These lateral physical restrictions create physical barriers to any digression of the flow lines from the above mentioned parallelism and thus act as channel walls which channelize the airflow in the desired direction. Hence the reason for naming this principle as the channel flow principle, or, simply, channel principle. The invention discloses a novel aircraft configuration of fractional aspect ratio in which the parasitic vortices are prevented by means of two side airfoils attached to the wing airfoil, the side airfoils acting as two physical barriers for channelizing the flow in the direction of flight, thus preserving the aerodynamic efficiency of the fractional aspect ratio airfoil or wing in spite of its unusually short span. The invention also discloses how these side airfoils can be used to provide optimum control surfaces for an aircraft of this type under all operating conditions, including variable angle of attack.

It is, therefore, an object of this invention to provide an airworthy heavier-than-air aircraft configuration having an airfoil wing with a fractional aspect ratio whose aerodynamic efficiency, stability and control are based upon the lift and channel aerodynamic flow theories of fluid medium.

It is an additional object of this invention to provide a fractional aspect ratio aircraft having a wing airfoil and two side airfoils, with the wing airfoil being devoid of any control surfaces, or at most having only braking flaps, and the side airfoils incorporating all control surfaces.

It is also an object of this invention to provide a fractional aspect ratio aircraft having a wing airfoil and two side airfoils, these airfoils in one instance being positioned in two vertical planes approaching parallelism to the vertical plane passing through the longitudinal axis of the wing airfoil, and, in the preferred illustrated instance being positioned in two planes silghtly diverging from each other from the leading edges toward the trailing edges of the side airfoils, and also slightly diverging from the bottom edge of the side airfoils toward their top edge, and having an outline in the above planes resembling that of an asymmetric ellipse or semi-ellipse, with the narrow end of the semi-ellipse constituting the front part and the broad end constituting the trailing part, with the control surfaces being located in the trailing broad ends of the side airfoils.

An additional object of this invention is to provide a fractional aspect ratio aircraft having gliding characteristics, or, stated differently, being capable of supporting and maintaining itself in a fully controllable glide without the aid of any prime mover or engine.

It is still another object of this invention to provide a fractional aspect ratio aircraft having two side airfoils proportioned and positioned with respect to the wing airfoil so as to act as effective basic stability surfaces and having adjustable, hinged flight control surfaces, constituting the empennage of the aircraft, all of the above flight control surfaces being a part of the side airfoils and lying in the planes of said airfoils when in normal positions.

The novel features which are believed to be characteristic of the invention, both as to its organization and method of operation together with further objectives and advantages thereto, will be better understood from the following description considered in connection with the accompanying drawings in which the invention is illustrated by way of example. It is to be expressly understood, however, that the drawings are for the purpose of illustration and description only and are not intended as a definition of the limits of the invention.

Figure 1 is an isometric view of a fractional aspect ratio aircraft;

Figure 2 is plan view of the aircraft illustrated in Fig. 1;

Figure 3 is a side elevational view of the aircraft of Fig. 1;

Figure 4 is a front view of the aircraft illustrated in Fig. 1;

Figures 5 and 6 are side elevations of the low aspect ratio aircrafts each illustrating another embodiment of the control surfaces.

Referring to Fig. 1, it illustrates a fractional aspect ratio aircraft in a perspective view with the wing airfoil 10 being mounted in the center of two side airfoils 11 and 12 being mounted on two sides of the wing airfoil. The side airfoils are provided with the following identical, hinged and adjustable flight control surfaces: mainfoils 13 and 14, upfoils 15 and 16, and downfoils 17 and 18. The plan, side and front views of this aircraft are illustrated in Figs. 2, 3 and 4, respectively. Examination of these figures discloses that the wing airfoil is a conventional, slightly cambered airfoil which offers a purely structural advantage of having a somewhat flatter bottom surface than the symmetrical airfoil, and is preferable for operational reasons because it has a flatter bottom surface. Either cambered or symmetrical airfoils, however, can be used, the symmetrical airfoil offering the structural advantage of being simpler to construct because of its perfect symmetry around its longitudinal axis.

Examination of the same figures also discloses that the side airfoils 11 and 12 constitute two airfoils permanently connected to the sides of the wing airfoil. The shape of the side airfoil is that of a compound airfoil, i. e., it has a blunt leading edge 19 or 20 when viewed from the top (Fig. 2) and it terminates in a relatively thin trailing end, which is also clearly illustrated in Fig. 2. The side airfoils are also shaped as airfoils in the vertical direction, as illustrated in Fig. 4, and, therefore, represent a three-dimensional airfoil tapering off into thin trailing edges in two directions: from head to tail (Fig. 2) and from bottom to top (Fig. 4). Figure 2 also illustrates that the center lines 21 and 22 of the side airfoils slightly digress toward the trailing end with the result that the "span" dimension of the leading edge 23 of the wing airfoil 10 is shorter than the trailing edge 24. Thus, the center lines 21 and 22 form a very sharp $\angle \theta$ with the lines parallel to the longitudinal axis 25. The reason for positioning the side airfoils 11 and 12 in the diverging planes is as follows: from a purely channel theory point of view, mentioned previously, all that is necessary is to place the side airfoils 11 and 12 in two vertical planes (as viewed in Fig. 2) parallel to the vertical plane passing through the longitudinal axis 25, and to make the size of these airfoils in these planes (as they appear in Fig. 3) sufficiently large to insure the channellized airflow under and above the wing airfoil 10, so that the flow lines follow the direction of flight illustrated by an arrow 26. Even when the side airfoils 11 and 12 are positioned in the two vertical parallel planes, they will offer a certain degree of directional stability since any slight deviation of the center line 25 from the direction of flight 26 will at once expose one side airfoil to an increased positive side pressure 27 or 28, Fig. 2, which at once will produce a restoring moment making center line 25 again parallel to the direction of flight 26. However, when the side airfoils are placed in two parallel planes, strictly speaking, the two forces 27 and 28 are each equal to zero, since the airflow in the side slip streams is parallel to the outer surfaces of the airfoils, and only frictional effects, exerted by the boundary layers, are present, which produce nothing but drag. Under such neutral conditions the structure is apt to oscillate and hunt, and this hunting and lack of basic stability can be prevented quite readily by applying sufficient "locking" forces 27 and 28 and corresponding momentums for positively insuring a constantly acting automatic directional stability. Such stability is made available by introducing $\angle \theta$, which at once introduces two equal and opposite direction-restoring moments, the one moment increasing and the other decreasing very rapidly in a case of any directional deviation, thus making available a useful restoring moment. The value of $\angle \theta$ is a matter of design and is controlled by such factors as the lever arms available, the masses involved, the areas of the side airfoils, which determine, in part at least, the magnitude of the forces 27 and 28, the expected speeds of flight, etc. Suffice to say that the value of the angle is not critical in the subsonic region, while it is equal to zero in the supersonic region.

The side airfoils, if viewed in a vertical plane, also have a configuration of an airfoil, as illustrated in Fig. 4. This is a purely functional configuration, offering the least amount of drag for the functions it performs, which are discussed below. If analyzed as purely side walls of a flow channel, those parts of the airfoils which are above the wing airfoil 10 would be only slightly higher or equal to their lower counterparts under the wing. However, since the side airfoils also perform the additional functions of the directional, lateral and longitudinal stability elements, and in addition, include all flight control surfaces, corresponding to an empennage of a conventional aircraft, it becomes advantageous to increase the area of the upper portion of the side airfoils in the manner illustrated in Figs. 3 and 4, beyond that required by the channel theory alone. The magnitude of the ratio of the upper area of the side airfoils (above wing 10) to that below wing 10 is of the order of 2 to 1, the above figure indicating merely an exemplary, single value, which has very wide limits. The configuration of the upper and lower areas is illustrated in Fig. 3, which is the side view of the aircraft.

Reverting once more to Fig. 4, the airfoil axes 30 and 31 form an angle $\alpha$ with the vertical lines and, therefore, the side airfoils are positioned in two planes which converge below the aircraft and intersect the vertical plane passing through the vertical axis 32 of the aircraft. The reason for inclining outwardly, in a dihedral manner, the two airfoils in this case is the same as that used in making them to diverge in the horizontal plane: to increase the basic lateral stability of the aircraft since the introduction of $\angle \alpha$ converts the side airfoils into two dihedral planes. In view of the similarity of purpose and action of the two angles, $\theta$ and $\alpha$, the considerations controlling the magnitude of angle $\theta$, mentioned previously, are also applicable in arriving at the optimum value of angle $\alpha$.

It would be helpful in understanding the action of the outer flat surface of the side airfoil, which is placed obliquely with respect to the direction of its travel, to visualize it as an almost folded away straight wing which is placed almost, but not quite, in the vertical plane parallel to the flow lines located outside of the aircraft. When this flat surface is parallel to the flow lines it is in a neutral position and no large forces act upon this plane, since it is in the position of least aerodynamic resistance. When it is deflected from this position it can do so only by deflecting the flow lines. The second Newton's law comes into play; for every action there is an equal and opposite reaction, and the reactions of the airstream take the form of forces acting on the surfaces of these wings when they being to unfold. Thus it may be shown quite readily that when such surface, inclined at the angles $\theta$ and $\alpha$, travels through air the forces acting on such surface may be represented as two horizontal forces 27 and 28 and two vertical lift forces 34 and 35, the approximate points of their applications to the respective airfoils being illustrated in Figs. 2, 3 and 4. If the aircraft changes its symmetrical position with respect to the horizontal line 36 by rotating around the center of gravity 33 in clockwise or counterclockwise direction, as indicated by an arrow 37, one of the angles $\alpha$ will become equal to zero while the other will become equal to $2\alpha$. One of the side airfoils will then place itself in a vertical plane ($\angle \alpha = 0$) and the vertical lift component of this airfoil will at once become equal to zero, since it is now parallel to the flow lines, while the lift component of the opposite airfoil will be greatly magnified since it is now removed from the vertical plane by an angle $2\alpha$. It will therefore, deflect the flow lines and this at once will create a restoring moment automatically returning the craft again to its horizontal position as viewed in Fig. 4. Although this lateral basic stability effect would be present even if both angles $\alpha$ were made equal to zero, and the two side airfoils were thus placed in two vertical planes parallel to the vertical axis 32, it is preferable to incline them at an angle $\alpha$ since this angle introduces constantly acting lift forces 34 and 35 which produce the same positive "locking" effect described in connection with Fig. 2 and angle $\theta$. It should be noted here that since the center of gravity 33 is below the points of application of the vertical and horizontal forces 28, 27, 34 and 35, there is a constant state of positive stable equilibrium or stable buoyancy of the aircraft in the air.

The basic longitudinal stability of the aircraft is illustrated in Fig. 3. The weight of the aircraft is represented by a vertical force 38, the lift produced by the wing airfoil is represented by a vertical force 39, and the total lift produced by the side airfoil is represented by the resultant force 40, the latter being the sum of the vertical forces 34 and 35. The summation of the two lifts, 39 and 40, produces the resultant lift 41 equal and opposite to the force 38 due to the gravitational pull. It is not difficult to perceive that the lift force 40 will increase quite rapidly if the side airfoil 12 is rotated clockwise around its leading edge. This is indeed the case since greater and greater area of this side-airfoil will be exposed to the positive dynamic pressure exerted by the moving air. This effect will take place because of the presence of the two angles θ and α. It therefore, follows that the craft will be restored to its original stable equilibrium position illustrated in Fig. 3. Conversely, if airfoil 12 is rotated in the counterclockwise direction, positive pressure will be exerted on the inner side and negative on the outer side of the airfoil with the resultant push and pull effects which will again restore the aircraft to its longitudinal equilibrium since the direction of force 40 now will be in the opposite direction to that illustrated in Figs. 3 and 4. The longitudinal stability action of the side airfoils 11 and 12 does not differ in any way from what is illustrated in Fig. 2, namely, the directional stabilizing effect of these airfoils. It is obvious at once that any turning of the aircraft around the center of gravity 33 in Fig. 2 will increase force 27 and decrease force 28 if the craft is rotated counterclockwise, and vice-versa. The above action is that which is commonly observed in connection with weather vanes which invariably align themselves with the direction of wind since this is the position of least aerodynamic resistance. The same is true of what is illustrated in Fig. 3 where the entire aircraft, including wing 10 and the side airfoils 11 and 12 align themselves as a unit with respect to the air in the position of least resistance to the airflow. It should be mentioned here that since the above discussion relates to the restoring moments produced by the side airfoils, the restoring effects produced by the wing airfoil itself are not considered.

From the above discussion it follows that positioning of the side airfoils in the manner indicated in Figs. 2 and 4 (angles θ and α) results in the creation of constantly acting positive balancing forces which will maintain the basic stability of the aircraft and will automatically return it into the positions illustrated in Figs. 2, 3 and 4 in which the longitudinal axis 25 coincides with the direction of flight 26 in all three dimensions, i. e., the three basic stability requirements—longitudinal, lateral and directional stabilities—are all present and satisfied because any slight deviation of the aircraft from the position of the least aerodynamic resistance at once creates large restoring moments which return it back to the state of stable equilibrium.

It is also fitting to mention here, in concluding the description of the basic stability of the disclosed aircraft that the efficacy, the efficiency, the speed of action of the restoring moments in any case, whether it is longitudinal, directional or lateral restoring moment, is enhanced here because reasonably large moments, acting against each other, and normally equal to each other, are used for holding the craft in the state of stable equilibrium. When this equilibrium is disturbed, one moment is increased very rapidly, while the other is either decreased or, in the extreme case, is even reversed in direction with the result that two positive moments now combine to act in the same direction, aiding each other in the task of restoring equilibrium. The concomitant result is inescapable; swift return to the state of balance, and lack of hunting in the process. The above description of the basic stability of the aircraft has been given with the understanding that the control surfaces are in neutral positions, and do not play any governing roll in the process. The neutral position is that in which all the control surfaces 13, 14, 15, 16, 17 and 18 are in the planes of the respective side airfoils 11 and 12, as illustrated in Figs. 1 through 4. These surfaces are used for controlling the path of flight and are described below.

Before proceeding with the description of the control effects produced by the upfoils 15, 16, downfoils 17, 18 and mainfoils 13 and 14, their structural features will be given here. The mainfoils are large, tapered and slightly curved surfaces, the curvature of these surfaces being illustrated in Fig. 4. They are hinged at lines 44 and 45 which are positioned slightly above the wing airfoil 10 and terminate slightly above the longitudinal axis 25 at the tail end of the craft, as illustrated in Fig. 3. Two effects are produced with this type of hinging or placing of the hinge lines 44 and 45: maximum available area is thus obtained for the mainfoils and since the lines 44 and 45 form an angle φ (Fig. 3) with the longitudinal axis 25, they have a large angle of attack when they are deflected from their neutral positions illustrated in the figures. An additional reason exists for positioning these hinge lines in the indicated manner: since the trailing ends of these lines are positioned almost at the point of their intersection with the longitudinal axis 25, the mainfoils do not interfere with the areas allocated for the upfoils 15 and 16 whose hinge lines 46 and 47 form an angle φ with the axis 25 and also begin at the point where axis 25 intersects side airfoil 12 at the tail end of this airfoil, as viewed in Fig. 3. The control area allotted to the upfoils 15 and 16 on their respective side airfoils may be varied by making angle φ larger or smaller, thus permitting the aircraft designer to obtain the sought control effects. The same is true of the downfoils 17 and 18 angle β between axis 25 and the hinge lines of these control elements. Since the upper portion of the side airfoils 11 and 12 is larger than that portion which is below wing 10, upfoils 15 and 16 have larger areas than the downfoils 17 and 18. However, the area of the downfoil can be increased by making angle β smaller than angle φ. All these control foils are located at the tail end of the entire craft and therefore the control forces produced by them will have lever arms of maximum length, which means that the produced moments will be as large as it is possible to obtain with the disclosed configuration of the aircraft. Because of the indicated positions of the control surfaces it becomes desirable to give the side airfoils the distorted semi-elliptic configuration indicated in Fig. 3, the semi-ellipse beginning at the leading edge of the craft and terminating with rounded contours at the tail of wing 10. The rounded contour is used purely for structural reasons, which avoids the use of any elements having costly corner construction for the upfoils and downfoils. The values of all angles φ, φ and β are not critical and are dictated by design considerations known in the art and, therefore, need no additional discussion here.

Proceeding now with the description of the control effects produced by the control surfaces, when upfoils 15 and 16 are in the planes of their respective airfoils 11 and 12 they do not produce any control action except that exerted by the side airfoils described previously, since in this position they represent no more than the extreme tail portions of these airfoils. Since the upfoils are inclined at angle φ, simultaneous swinging or turning of the upfoils 15 and 16 outwardly will produce two additional lift components symmetrically disposed on both sides of the craft with the result that the tail will be lifted above the nose and the aircraft will go into a dive. When the upfoils are deflected outwardly 90° the only two forces that will be produced are a lift component acting in the vertical direction and a horizontal component acting in the direction opposite to the direction of flight, which will introduce an additional drag. When the deflection is less than 90° the impact of the air on the upfoil in any position between 90° and 0° will produce a vertical lift component, a drag component and an additional component acting in the direction at right angles to the lift and drag components and in the direction parallel to the respective side forces 27 and 28. The latter is equivalent to a side push on the tail of the craft. These side push components will neutralize each other if the upfoils are deflected outwardly by the same angle and the remaining effective components are drag and lift. Therefore, symmetrical and simultaneous outward deflection of the upfoils will produce only a dive, i. e., lifting of the craft's tail. Such upward deflection of the tail end will be automatically resisted by the previously described longitudinal stability of the craft until the two effects establish a new equilibrium corresponding to a definite angle of descent for a definite angle of deflection of the upfoils 15 and 16.

The opposite is true of the downfoils 17 and 18 because they are inclined at an angle β with respect to the longitudinal axis 25. Therefore, the simultaneous outward deflection of the downfoils will produce a downward pull on the tail and the craft will go into a climb, the tail having been lowered by the downfoils. This is so because the airstream in this case is deflected up, while the upfoils 15 and 16 deflect it down. The reaction will act in the direction opposite to the direction of deflection of the air stream. As in the case of the upfoils, the angle of climb will be determined by the angle of deflection of the downfoils, the forces produced by their deflection finally establishing a stable equilibrium, and fixed angle of climb, with the forces produced due to the longitudinal stability of the craft. The angle of climb may be changed by changing the angle of deflection of the downfoils.

When all four control foils, 15, 16, 17 and 18 are deflected outwardly simultaneously and symmetrically, the lift will be neutralized by the down pull, and the only remaining component will be that of drag, which will act as an air brake on the entire aircraft.

When one upfoil and one downfoil of the same side airfoil are deflected outwardly, say foils 16 and 18, Fig. 1, the vertical components will neutralize each other, the two drags will combine to produce the resultant drag, and the two side-push components also produce the resultant side-push component acting in the direction of side-thrust force 28 except that it will act almost at the tail end of the craft. The resultant drag and side-push will combine in producing a left turn of the craft as viewed in the direction of flight. The above will also produce banking of the entire craft to the left, the control surfaces predominating over the initial restoring action of the side airfoils. Once banking is established, it will persist so long as the control foils 16 and 18 remain in the deflected positions. The automatic banking takes place because of the increased side pressure 27 on airfoil 11. This force is acting above the wing, and therefore, the forces generated by the foils 18 and 16 and increased force 27 will create a twisting couple causing the appropriate bank preventing a side slip.

The directional trim is obtained by setting the downfoils and upfoils on one side at a corresponding deflection which will counterbalance the cause of unbalance such as cross-wind or unbalanced pull or thrust due to one-sided failure of an engine.

An additional control effect may be achieved by creating twisting couples which will tend to turn the craft around its axis 25 in a clockwise or a counter-clockwise direction. This can be obtained by turning downfoil 18 outwardly, upfoil 16 inwardly, upfoil 15 outwardly and downfoil 17 inwardly. A twisting moment will be created which will turn the craft around its axis 25 without disturbing its longitudinal and directional stabilities because of the cancellation of equal and opposite lift and pull forces exerted by the upfoils and downfoils. The same may be accomplished by deflecting only two foils, such as upfoil 16 and downfoil 17.

The mainfoils 14 and 13 represent large lift surfaces capable of exerting a large lift force located in the trailing half of the craft. The mainfoils can perform the following functions: to provide a large lift at a higher angle of attack than the normal angle of attack of wing 10, this additional lift being especially useful at low speeds; to provide a large adjustable lift to compensate for large variations in the center of gravity. The first function—large lift—is provided by making the surfaces 13 and 14 as large as possible, and by making angle φ such as to produce maximum lift at the expected landing speeds. It means that the root-lines of the mainfoils should be located quite close to wing 10. The remaining functions follow from the first and, therefore, need no additional description. Examination of the above arrangement reveals that among other things, the mainfoils permit the craft to land without placing wing 10 at an undesirably large angle of attack since landing at low speeds is made possible by deflecting the mainfoils which are provided with large angle of attack φ and, therefore, are eminently suitable for providing the additional lift without increasing the angle of attack of wing 10. Thus a very desirable feature is attained, namely the aircraft can be kept at an "even keel" during take-off, landing as well as during the flight. It is to be noted here that operation of the mainfoils does not interfere with the operation of the upfoils 15 and 16, which still remain available for controlling the path of flight. It also should be noted here that the downfoils are available for attaining proper force distribution when the mainfoils are deflected outwardly to produce an additional lift.

It is to be understood that modifications on the basic control surfaces herein disclosed may be made without departing from the spirit of the invention. Moreover, additional control surfaces may be provided on certain embodiments of the invention should the function of the aircraft make additional controls desirable.

Figs. 5 and 6 illustrate two embodiments of fractional aspect ratio aircraft, which utilize seven and six control surfaces, respectively, per side panel element. It will be noted that the control surfaces illustrated in Fig. 5 provide converging control hinge axes similar to the basic controls disclosed in connection with Fig. 1, whereas the control surfaces shown in Fig. 6 provide control hinge axes arranged in a "zig-zag" pattern. The action and operation of the control surfaces illustrated in Figs. 5 and 6 is substantially the same as that set forth in connection with Fig. 1 and, therefore, need no further description.

The above completes the description of the stability and controllability provided by the present aircraft.

What is claimed as new is:

1. An aircraft comprising: a single wing airfoil having a fractional aspect ratio of a value less than ⅓, said wing airfoil providing a first aerodynamic lift force for said aircraft; a pair of side airfoils mounted one on each side of said wing airfoil and including major portions that are in permanently fixed relation to said wing airfoil in planes substantially normal thereto, said wing and side airfoils being joined to one another throughout the length of said wing, for channeling the airflow over and under said wing airfoil to a substantially two dimensional flow, said side airfoils being dihedrally positioned with respect to a plane longitudinally bisecting said wing airfoil, the dihedral positioning of said side airfoils stabilizing said aircraft and providing second and third aerodynamic lift forces, respectively, for said aircraft.

2. The aircraft defined in claim 1 wherein each of said first and second side airfoils includes a plurality of control surfaces, the number of control surfaces in said first side airfoil being equal to the number of control surfaces in said second side airfoil; and said control surfaces being attached said side airfoils for deflection from the respective planes of said side airfoils for controlling and maneuvering said aircraft when said aircraft is in flight.

3. A fractional aspect ratio aircraft comprising: a single wing, said wing comprising a single fractional aspect ratio airfoil; and first and second side airfoils attached to said wing at first and second lateral sides thereof, respectively; said wing having top and bottom airfoil surfaces for aerodynamically supporting said aircraft when said aircraft is in flight; said side airfoils having major portions thereof in permanently fixed relation to said wing, in substantially vertical planes substantially parallel and fully symmetrical with respect to the vertical plane of the major longitudinal axis of said wing, and extending above and below said top and bottom airfoil surfaces of said wing respectively; the ratio of the area of said side airfoils normally extending above said top surface to the area of said side airfoils normally extending below said bottom surface being of the order of two to one, said side airfoils channeling the airflow over said wing airfoil for maintaining a substantially two dimensional airflow under and over said wing airfoil when said aircraft is in flight; and said planes having a first symmetrical divergence from the leading end toward the trailing end of said wing airfoil; and a second symmetrical divergence when viewed from the bottom toward the top of said aircraft; said first divergence being provided for reinforcing the basic directional stability of said aircraft; said second divergence being provided for reinforcing the basic lateral stability of said aircraft; and said first and said second divergences, in combination, reinforcing the basic longitudinal stability of said aircraft; said side air foils each including a mainfoil, an upfoil and a downfoil; said mainfoil being positioned substantially to the rear of the center of gravity of said aircraft in the portion of said side airfoil extending above said top surface of said wing airfoil; said mainfoil being hinged to its side airfoil along a first hinge axis, said first hinge axis being positioned at a predetermined first acute angle with respect to the chordline of said aircraft, said mainfoil being deflectable from the plane of said side airfoil for providing an additional lift force for said aircraft and for aerodynamically compensating for a shift in said center of gravity of said aircraft; said upfoil and downfoil being positioned in the rear uppermost and rear lowermost portions, respectively, of said side airfoil, and being respectively hinged to said mainfoil and to the side airfoil along a second and third hinge axes, respectively; said second and third hinge axes being positioned at predetermined second and third acute angles, respectively, relative to the chordline of said aircraft; said upfoil and downfoil being deflectable for controlling the direction of flight of said aircraft.

4. An aircraft comprising: a single wing, said wing comprising a single airfoil having a fractional aspect ratio of a value not greater than one-third, said wing providing an aerodynamic lift force for said aircraft; a pair of side airfoils affixed to the respective sides of said wing, said side airfoils extending above and below the upper and lower surfaces of said wing airfoil respectively, being substantially parallel to but slightly diverging to the rear symmetrically with respect to the vertical plane of the major longitudinal axis of said wing, and diverging upwardly symmetrically with respect to said major axis, said side airfoils functioning to stabilize said aircraft and to restrict the airflow over said wing airfoil to a substantially two-dimensional flow.

5. The aircraft defined in claim 4, wherein the surface area of said first and second side airfoils extending above said wing airfoil is of the order of twice the surface area of said side airfoils extending below said wing airfoil.

6. The fractional aspect ratio aircraft defined in claim 4, wherein said side airfoils have elongated oval outlines in their vertical longitudinal planes, each including a narrow portion constituting its leading end, and a wide portion constituting its trailing end, said narrow and wide portions extending above and below the upper and lower surfaces of said wing airfoil for maintaining a two-dimensional airflow under and over said wing airfoil when said aircraft is in flight.

7. A fractional aspect ratio aircraft comprising: a single wing, said wing comprising a single fractional aspect ratio airfoil; and two side airfoils attached to respective sides of said wing; said wing having top and bottom airfoil surfaces for aero-dynamically supporting said aircraft when in flight; said side airfoils having major portions thereof in permanently fixed relation to said wing, in substantially vertical planes substantially parallel and fully symmetrical with respect to the vertical plane of the major longitudinal axis of said wing, and extending above and below said top and bottom airfoil surfaces of said wing, respectively; the ratio of the area of said side airfoils normally extending above said top surface to the area of said side airfoils normally extending below said bottom surface being of the order of two to one, said side airfoils channeling the airflow over said wing airfoil for maintaining a substantially two dimensional airflow under and over said wing airfoil when said aircraft is in flight, said planes having a first symmetrical divergence from the leading end toward the trailing end of said wing airfoil; and a second symmetrical divergence from the bottom toward the top of said aircraft; said first divergence being provided for reinforcing the basic directional stability of said aircraft; said second divergence being provided for reinforcing the basic lateral stability of said aircraft; and said first and said second divergences, in combination, reinforcing the basic longitudinal stability of said aircraft.

8. In a fractional aspect ratio aircraft having a single wing airfoil for providing an aerodynamic lift force for said aircraft; said single wing airfoil having a fractional aspect ratio; first and second side airfoils mounted one on each side of said wing airfoil, said side airfoils having an elongated contour corresponding to an outline of the projection of an egg to a plane, with the long axis of said outline extending in the direction of the longitudinal axis of said wing airfoil, the transverse dimension of said outline increasing toward the trailing end of said wing airfoil, said transverse dimension being greater, at any given point along the chord of said wing airfoil, than the corresponding depth of said wing airfoil, and extending above and below said wing airfoil; said side airfoils diverging symmetrically with respect to both the vertical and longitudinal axes of said wing airfoil, whereby the minimum transverse dimension between said side airfoils is at the lower front, leading ends of said airfoils; and the maximum transverse dimension between said side airfoils is at the upper, rear, trailing ends of said airfoils, said side airfoils having airfoil configurations in the vertical and horizontal directions, said side airfoils tapering off into a thin trailing edge from the leading edge toward the trailing edge, and from the bottom edge toward the top edge.

9. The fractional aspect ratio aircraft defined in claim 8, wherein said side airfoils have a length substantially equal to the chord of said wing airfoil, and being coextensive with said wing airfoil.

References Cited in the file of this patent

UNITED STATES PATENTS

| 1,027,322 | Cole | May 21, 1912 |
| 1,095,952 | Arnoux | May 5, 1914 |
| 1,656,193 | Hall | Jan. 17, 1928 |
| 1,893,129 | Charpentier | Jan. 3, 1933 |
| 1,968,497 | Magalis | July 31, 1934 |
| 1,980,246 | Austin | Nov. 13, 1934 |
| 1,987,050 | Burnelli | Jan. 8, 1935 |
| 2,194,596 | Henter | Mar. 26, 1940 |
| 2,316,885 | Ortega | Apr. 20, 1943 |
| 2,353,856 | Shannon | July 18, 1944 |
| 2,428,194 | Bockrath | Sept. 30, 1947 |
| 2,437,684 | Custer | Mar. 16, 1948 |
| 2,472,763 | Rodeck | June 7, 1949 |
| 2,496,087 | Fleming | Jan. 31, 1950 |
| 2,649,265 | Grant | Aug. 18, 1953 |

FOREIGN PATENTS

| 543,858 | Germany | Feb. 10, 1932 |

OTHER REFERENCES

Flight publication, October 5, 1950, p. 377.
NaCA Technical Note 2229, November 1950, pp. 21, 23–30.